United States Patent [19]
Fritts

[11] Patent Number: 4,951,697
[45] Date of Patent: Aug. 28, 1990

[54] RUPTURE DISK FAILURE INDICATING APPARATUS

[75] Inventor: Donald K. Fritts, Tulsa, Okla.

[73] Assignee: BS&B Safety Systems, Inc., Tulsa, Okla.

[21] Appl. No.: 441,771

[22] Filed: Nov. 27, 1989

[51] Int. Cl.$^5$ .................... F16K 17/16; F16K 37/00
[52] U.S. Cl. .................... 137/68.1; 137/552;
137/557; 220/89 A; 116/266; 116/272;
116/DIG. 7
[58] Field of Search .................... 137/68.1, 552, 557;
220/89 A; 116/266, 270, 272, 112, 4, DIG. 1,
DIG. 7

[56] References Cited

U.S. PATENT DOCUMENTS

| | | | |
|---|---|---|---|
| 1,402,139 | 1/1922 | Bradley | 116/272 X |
| 1,485,913 | 3/1924 | Gottlieb | 137/68.1 |
| 1,657,857 | 1/1928 | Faith | 116/272 |
| 2,263,840 | 11/1941 | Franck | 116/272 |
| 2,754,788 | 7/1956 | Sperry | 116/272 X |
| 3,031,165 | 4/1962 | Allen | 251/111 |
| 3,181,496 | 5/1965 | Bilbrey | 116/70 |
| 3,203,246 | 8/1965 | Horwitt et al. | 116/272 X |
| 3,691,981 | 9/1972 | Rao | 116/272 |
| 3,770,918 | 11/1973 | Fortmann | 137/68.1 X |
| 3,780,693 | 12/1973 | Parr | 116/270 |
| 4,085,764 | 4/1978 | Raidl, Jr. | 137/68.1 |
| 4,232,698 | 11/1980 | Hosterman et al. | 137/68.1 |
| 4,246,933 | 1/1981 | Taylor | 137/557 X |
| 4,257,528 | 3/1981 | Brodie | 137/68.1 X |
| 4,263,929 | 4/1981 | Kearney | 137/68.1 |
| 4,270,560 | 6/1981 | Kearney | 137/68.1 |
| 4,342,988 | 8/1982 | Thompson et al. | 137/68.1 X |
| 4,364,487 | 12/1982 | Drumare | 137/68.1 X |
| 4,438,792 | 3/1984 | Timberlake, Jr. | 116/266 X |
| 4,468,969 | 9/1984 | Schwartz | 73/744 |
| 4,840,195 | 6/1989 | Zabrenski | 137/557 X |

*Primary Examiner*—John Rivell
*Attorney, Agent, or Firm*—Laney, Dougherty, Hessin & Beavers

[57] ABSTRACT

The present invention provides apparatus for visually indicating the failure of a rupture disc comprised of an elongated hollow body member, a piston disposed in the body member which is moved therein by pressurized fluid pressure exerted thereon, and an elongated indicator pin which is pushed by the piston through an opening in the body when pressurized fluid causes the piston to be moved therein. The body member includes a pressurized fluid exhaust port which is opened by the movement of the piston. Pressurized fluid exhausted through the exhaust port can be vented to prevent abnormal rupture disk operation or it can be utilized to activate an alarm.

8 Claims, 3 Drawing Sheets

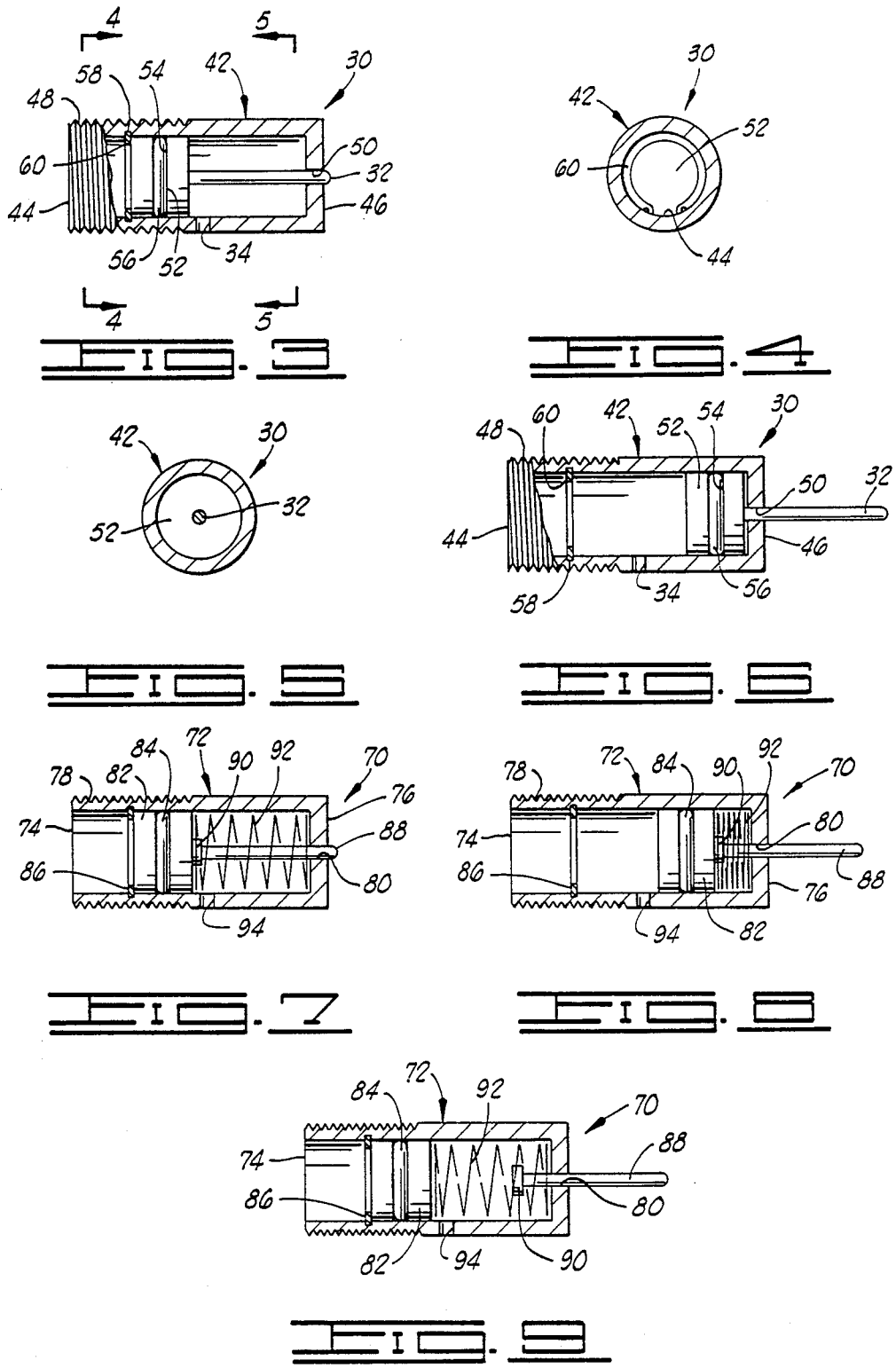

RUPTURE DISK FAILURE INDICATING APPARATUS

BACKGROUND OF THE INVENTION

1. Field of the Invention

The present invention relates generally to rupture disk failure indicating apparatus, and more particularly, but not by way of limitation, to apparatus for indicating a pressure change resulting from the loss in integrity of a rupture disk.

2. Description of the Prior Art

Rupture disks and rupture disk assemblies are often utilized in applications where an indication of the failure of the rupture disks is desirable or necessary. For example, when a rupture disk in process equipment fails and relieves pressurized fluid, it is generally necessary to immediately shut down at least a portion of the equipment or to take other action, and accordingly, an indication of the failure of the rupture disk is highly desirable.

Rupture disks are often sealingly supported internally between annular supporting members which are bolted or clamped together, or which are clamped between bolted flanges. The supporting members and/or bolted flanges are in turn sealingly connected between pressurized fluid containing zones, and consequently, the rupture of a rupture disk usually can not be visually observed and often goes undetected for at least an initial period of time.

In some applications, several rupture disks are positioned in series between pressure zones. Also, rupture disks are very commonly positioned between pressure vessels or system containing pressurized fluid and relief valves connected to the vessels or systems to prevent leakage through the relief valves. A problem commonly experienced in the use of a multiple disk or rupture disk-relief valve combination is that the upstream rupture disk can prematurely fail in a manner whereby fluid pressure is exerted on the downstream rupture disk or the relief valve without being detected. This in turn frustrates the benefits of the combination and can result in the occurrence of a dangerous over-pressure condition.

By the present invention, improved rupture disk failure indicating apparatus for indicating the presence of pressurized fluid resulting from the failure of a rupture disk are provided which can conveniently be utilized in any of the applications described above. As used herein in relation to rupture disks, the term "failure" includes any loss in integrity of a rupture disk whereby pressurized fluid leaks or otherwise passes through the rupture disk.

SUMMARY OF THE INVENTION

By the present invention improved rupture disk failure indicating apparatus and rupture disk assemblies including such apparatus are provided. The rupture disk failure indicating apparatus are each basically comprised of an elongated hollow body member having an open end adapted to be sealingly connected to a passageway for communicating pressurized fluid resulting from the failure of a rupture disk thereto, and having an indicator opening in the other end. A piston is disposed in the body member for moving therewithin from the end portion of the body member connected to the passageway to the other end portion of the body member in response to pressurized fluid pressure exerted on the piston. An elongated indicator pin is positioned in the body member between the piston and the other end of the body member. The indicator pin is adapted to pass through the indicator opening in the body member whereby when the piston is moved by pressurized fluid to the other end of the body member, the indicator pin is extended through the opening to thereby provide a visual indication of the failure of the rupture disk. The body member also includes a pressurized fluid exhaust port formed in a side thereof and positioned whereby when the piston is moved to the other end of the body member, it passes the port and allows pressurized fluid to be exhausted therethrough.

The feature of the present invention whereby a visual indication of the presence of pressurized fluid in a zone is provided and the pressurized fluid is exhausted from the zone is particularly beneficial in multiple disk and rupture disk-relief valve combinations. The exhausting of the pressurized fluid in such combinations prevents unsafe conditions and improper operation from occurring. In other applications the exhausted pressurized fluid can be utilized to activate an alarm circuit.

In applications where it is desirable to automatically return the piston to its original position after the operation of the apparatus or where a downstream fluid pressure is exerted on the apparatus, a compression spring can be included in the apparatus.

Thus, it is a principal object of the present invention to provide an improved rupture disk failure indicating apparatus.

A further object of the present invention is the provision of a failure indicating rupture disk assembly whereby when a rupture disk in the assembly fails for any reason, a visual indication of the failure is given. Also, if a single rupture disk assembly is installed upside down with the failure indicating apparatus on the upstream side of the rupture disk, an immediate indication of improper installation is given by the indicator apparatus.

Another object of the present invention is the provision of a rupture disk assembly including a combination of two or more rupture disks or a rupture disk and relief valve wherein a visual indication of the failure of the upstream rupture disk is given and pressurized fluid is exhausted from the zone downstream of the failed rupture disk.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a partially cross-sectional view of a rupture disk failure indicating apparatus of the invention.

FIG. 4 is a cross-sectional view taken along line 4—4 of FIG. 3.

FIG. 5 is a cross-sectional view taken along line 5—5 of FIG. 3.

FIG. 6 is a partially cross-sectional view of the rupture disk failure indicating apparatus of FIG. 3 after the presence of pressurized fluid has caused the apparatus to provide a visual indication thereof.

FIG. 7 is a cross-sectional view of an alternate form of the rupture disk failure indicating apparatus of the invention.

FIG. 8 is a cross-sectional view of the apparatus of FIG. 7 after the partial operation thereof.

FIG. 9 is a cross-sectional view of the apparatus of FIG. 7 after the full operation thereof.

DESCRIPTION OF PREFERRED EMBODIMENTS

Figure 1:
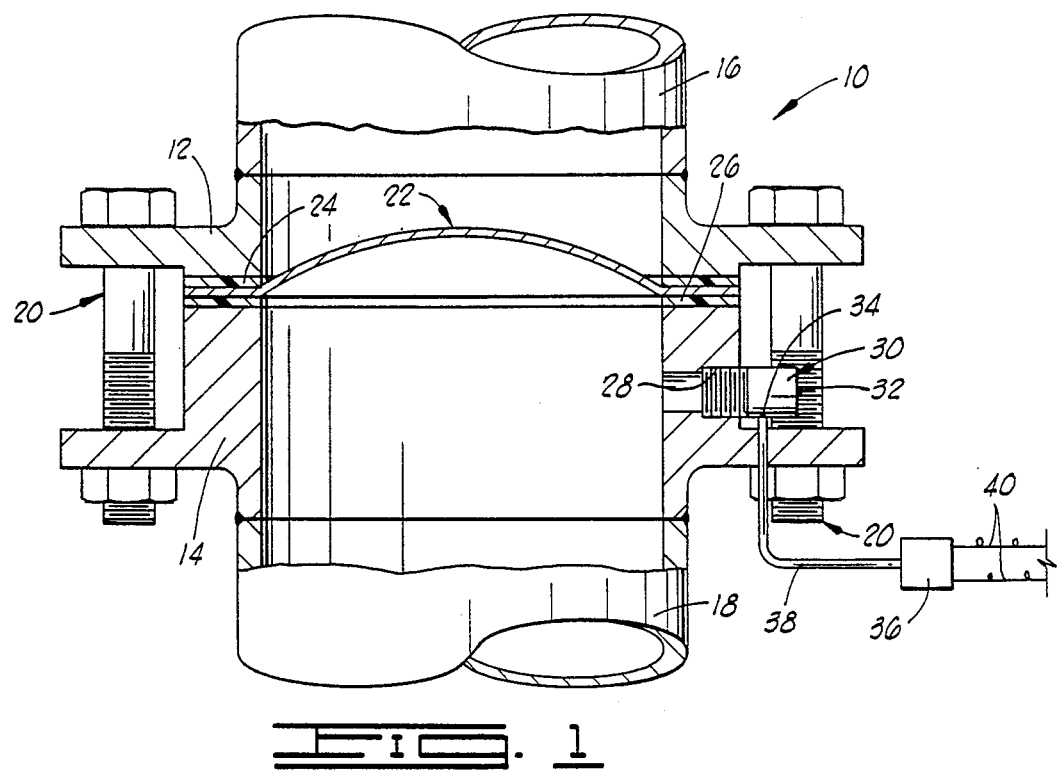
FIG. 1 is a side partially cross-sectional view of a rupture disk assembly of the present invention.
Figure 2:
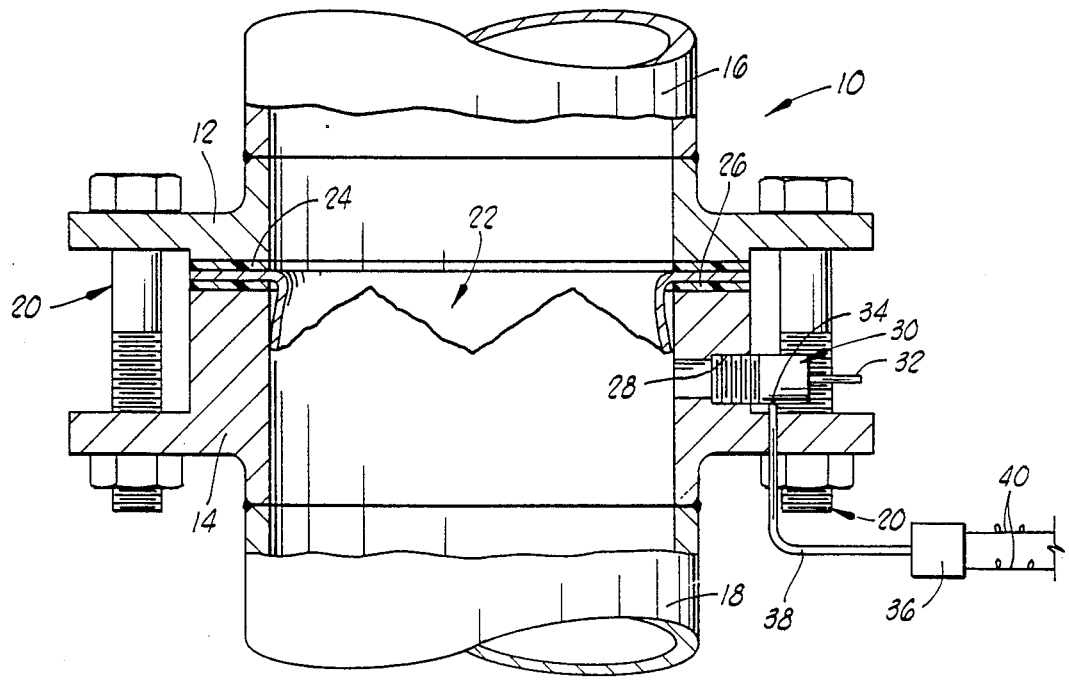
FIG. 2 is a view of the apparatus of FIG. 1 after failure of the rupture disk has occurred.

Referring now to the drawings, and particularly to FIGS. 1 and 2, a failure indicating rupture disk assembly of the present invention is illustrated and generally designated by the numeral 10. The assembly 10 is comprised of a pair of rupture disk supporting members 12 and 14 which are in the form of bolted flanges and which are attached to conduits 16 and 18, respectively. Clamped between the supporting members 12 and 14 are a reverse buckling rupture disk 22 and gaskets 24 and 26 positioned on opposite sides of an annular flat flange portion of the rupture disk. A plurality of studs and nuts, generally designated by the numeral 20, are utilized to sealingly clamp the rupture disk 22 and gaskets 24 and 26 between the supporting members 12 and 14.

The conduit 16 is connected to a first zone for containing pressurized fluid, and the conduit 18 is connected to a second zone for receiving pressurized fluid from the first zone. The first zone, for example, can be a pressure vessel or system containing pressurized fluid which is being protected from reaching over-pressure conditions by the rupture disk 22. The second zone can also be a pressure vessel or system such as a low pressure holding tank for receiving the pressurized fluid from the first zone.

The supporting member 14 includes a threaded pressurized fluid passageway 28 extending from the interior to the exterior thereof. Threadedly connected to the passageway 28 is a rupture disk failure indicating apparatus generally designated by the number 30 which will be described in detail hereinbelow. The apparatus 30 includes an indicator pin 32 for visually indicating the failure of the rupture disk 22 in the assembly 10, and a pressurized fluid exhaust port 34, which in the arrangement illustrated in FIGS. 1 and 2, is connected to a pressure operated electric switch means 36 by a conduit 38. The switch means 36 is in turn connected to an alarm circuit by electric leads 40.

In operation of the assembly 10, when the first zone connected to the assembly 10 by the conduit 16 is in a normal pressure condition, the rupture disk 22 remains intact and pressurized fluid is prevented thereby from entering the supporting member 14, the conduit 18 and the second zone connected to the conduit 18. Because pressurized fluid is not present within the supporting member 14 and the passageway 28 thereof, the indicator pin 32 of the rupture disk failure indicating apparatus 30 is not extended and the alarm circuit connected to the leads 40 of the pressure operated switch 36 is not activated, all as shown in FIG. 1.

When an over-pressure in the first zone connected to the conduit 16 exists, it causes the rupture disk 22 to fail as indicated in FIG. 2. Upon the failure of the rupture disk 22, pressurized fluid enters the support member 14, the conduit 18 and the second zone connected thereto causing pressurized fluid to flow through the passageway 28 in the supporting member 14 and to apply pressurized fluid pressure to the indicating apparatus 30. Such pressure causes the indicator pin 32 of the apparatus 30 to be extended thereby providing a visual indication of the rupture disk failure. Also, and substantially simultaneously with the extension of the indicator pin 32, pressurized fluid pressure is transmitted by way of the conduit 38 to the pressure responsive switch means 36 which in turn activates the alarm circuit connected thereto.

If the assembly 10 is improperly installed whereby it is up-side down, i.e., the failure indicating apparatus 30 is positioned on the upstream side of the rupture disk 22 instead of the downstream side thereof as illustrated in FIG. 1, the upstream fluid pressure exerted on the disk immediately causes the operation of the apparatus 30 indicating the improper installation.

Referring now to FIGS. 3-6 the indicating apparatus 30 is illustrated in detail. The apparatus 30 is comprised of an elongated cylindrical hollow body member 42 having an open end 44 and a partially closed end 46. Threads 48 are disposed on the end portion of the body member 42 adjacent the open end 44 thereof, and an indicator opening 50 is disposed in the otherwise closed end 46 of the body member 42. A cylindrical piston 52 is disposed within the body member 42, and the indicator pin 32 is connected to or abuts the piston 52 at one end thereof with the other end extending through the opening 50 in the end 46 of the body member. The cylindrical external sides of the piston 52 include a continuous annular groove 54 formed therein, and a conventional O-ring sealing member 56 is disposed in the groove 54. A continuous internal groove 58 is also disposed within the body member 42 adjacent the open end 44 thereof, and a conventional snap ring 60 is disposed within the groove 58 to retain the piston 52 within the body member 42.

The indicator pin 32 is of a uniform size adapted to slide through the indicator opening 50 in the body member 42. As shown in FIG. 6, when pressurized fluid pressure is exerted on the piston member 52 by way of the open end 44 of the body member 42, the piston 52 is moved to the end 46 of the body member 42, and the indicator pin 32 is extended through and beyond the indicator opening 50 whereby a visual indication of the presence of pressurized fluid and the rupture of a rupture disk is indicated.

The exhaust port 34 is disposed in a side of the body member 42 at a position generally intermediate to the ends 44 and 46 of the body member 42. As illustrated in FIG. 3, when the piston 52 is positioned adjacent the open end 44 of the body member 42 with the indicator pin 32 retracted within the body member 42, the exhaust port 34 is closed off from the open end 44 of the body member 42 by the piston 52. When the piston 52 is moved to a position adjacent the other end of 46 of the body member 42 as illustrated in FIG. 6, it passes the exhaust port 34 whereby the exhaust port 34 is communicated with the open end 44 of the body member 42, and pressurized fluid present within the body member 42 is allowed to exhaust therefrom by way of the exhaust port 34.

In the operation of the indicating apparatus 30, the body member 42 is threadedly connected to a passageway for communicating pressurized fluid resulting from the failure of a rupture disk to the apparatus 30. The pin 32 is manually pushed into the body member 42 which moves the piston 52 to an initial position adjacent to open end 44 of the body member 42, i.e., to a position adjacent the snap-ring 60. When pressurized fluid enters the body member 42 by way of the open end 44 thereof by way of the passageway to which the body member 42 is connected as a result of a rupture disk failure, the pressurized fluid exerts pressure on the piston member 52 causing it to move pass the exhaust port 34 to the other end 46 of the body member 42 as shown in FIG. 6. The indicator pin 32 is extended to provide a visual indication of the rupture disk failure, and pressurized fluid is exhausted from the body member 42 and from the passageway communicated with the body member 42 by way of the exhaust port 34. As will be understood by those skilled in the art, the exhaust port 34 can be left open to the atmosphere if the fluid being exhausted is non-polluting and otherwise non-hazardous, or the fluid being exhausted can be conducted by a conduit to a container or system for disposing of the fluid. Alternatively, as described above, the pressurized fluid exhausted through the port 34 can be conducted by a conduit to a pressure operated switch or other apparatus for activating an alarm.

Referring now to FIGS. 7-9 an alternate embodiment of the rupture disk failure indicating apparatus of the present invention is illustrated, and generally designated by the numeral 70. The apparatus 70 is similar to the apparatus 30 in that it includes an elongated cylindrical body member 72 having an open end 74 and a partially closed end 76. Threads 78 are formed on the end portion of the body member 72 adjacent the open end 74 thereof, and an indicator opening 80 is disposed in the end 76 of the body member 72. A piston 82 including an O-ring seal 84 is retained within the body member 72 by a snap-ring 86. An indicator pin 88 adapted to slide through the indicator opening 80 of the body member 72 is disposed within the body member 72. Instead of being connected to the piston 82, the indicator pin 80 includes an enlarged head portion 90 which abuts the piston 82. A compression spring 92 is disposed between the piston 82 and the partially closed end 76 of the body member 72. An exhaust port 94 is disposed in a side of the body member 72.

In operation of the apparatus 70, pressurized fluid pressure exerted on the piston 82 moves the piston 82 past the exhaust port 94 towards the other end 76 of the body member 72 whereby the spring 90 is compressed as illustrated in FIG. 8. The movement of the piston 82 pushes and moves the indicator pin 88 through the indicator opening 80 providing visual indication of the presence of pressurized fluid within the body member 72. Pressurized fluid is exhausted from the body member 72 by way of the exhaust port 94 whereupon the compression spring moves the piston 82 back to a position past the exhaust port 94 adjacent to the snap-ring 86. Thus, the spring 90 functions to close off the exhaust port 94 from communication with the open end 74 of the body member 72 after pressurized fluid has been exhausted but the indicator pin 88 continues to remain extended and to provide a visual indication of rupture disk failure until the pin 88 is manually returned to a position within the body member 72. The indicating apparatus 70 is useful in applications where it is desired to minimize the quantity of pressurized fluid exhausted by way of the port 94 and in other applications where some permissible pressure as a result of the presence of pressurized fluid is permissible within the zone connected to the indicating apparatus 70.

Figure 10:
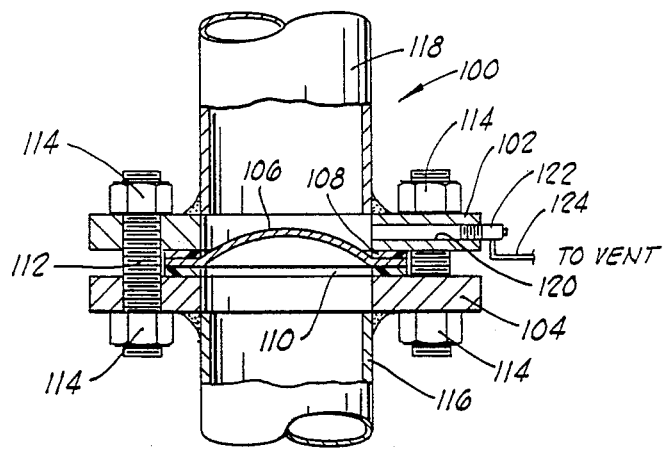
FIG. 10 is a side partially cross-sectional view of an alternate form of a failure indicating rupture disk assembly of the present invention.

Referring now to FIG. 10, an alternate form of failure indicating rupture disk assembly of the present invention is illustrated and generally designated by the numeral 100. The assembly 100 is similar to the assembly 10 in that it includes a pair of supporting members 102 and 104 having a rupture disk 106 and gaskets 108 and 110 clamped therebetween by a plurality of studs 112 and nuts 114. A conduit 116 is connected between a first zone for containing pressurized fluid and the supporting member 104, and a conduit 118 is connected between the supporting member 102 and a second zone for containing pressurized fluid. The apparatus 100 differs from the apparatus 10 in that the rupture disk 106 ruptures in the conventional mode, i.e., it ruptures in tension as opposed to a reverse buckling rupture disk which is initially in compression and ruptures as a result of reversal. The supporting member 102 includes a passageway 120 disposed therethrough and a rupture disk failure indicating apparatus of the present invention 122 is sealingly connected to the passageway 120. The exhaust port of the apparatus 122 is connected by a conduit 124 to a vent. The operation of the apparatus 100 is identical to the operation of the apparatus 10 described above except that pressurized fluid is exhausted to the atmosphere by way of a vent.

Figure 11:
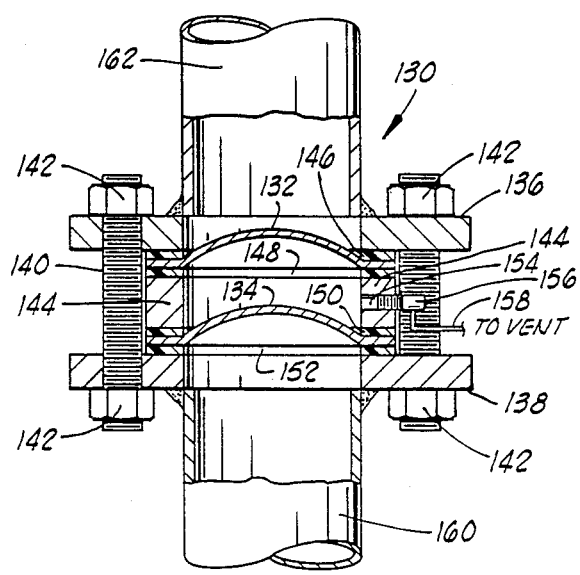
FIG. 11 is a partially cross-sectional view of yet another form of failure indicating rupture disk assembly of the present invention.

Referring now to FIG. 11, another failure indicating rupture disk assembly of the present invention is illustrated, generally designated by the numeral 130. In the assembly 130, a pair of rupture disks 132 and 134 are clamped between flanges 136 and 138 by a plurality of studs 140 and nuts 142. An intermediate annular supporting member 144 is disposed between the rupture disks 132 and 134, and gaskets 146, 148, 150 and 152 are positioned between the rupture disks 132 and 134 and the supporting members. The flange 138 is sealingly connected to a conduit 160 which is in turn connected to a first zone containing pressurized fluid. The space between the rupture disks 132 and 134 constitutes a second zone for containing pressurized fluid, and the flange 136 is sealingly connected to a conduit 162 which is in turn connected to a third zone for containing fluid pressure.

The supporting member 144 includes a pressurized fluid communicating passageway 154 extending from the interior to the exterior thereof, and a rupture disk failure indicating apparatus 156 is sealingly connected to the exterior of the passageway 154. A conduit 158 connected to the exhaust port of the indicating apparatus 156 conducts exhausted pressurized fluids to a vent (not shown).

In operation of the assembly 130, if the rupture disk 134 fails for any reason without a corresponding failure of the disk 132, pressurized fluid enters the second zone between the disks 132 and 134 and flows through the passageway 154 whereby pressurized fluid pressure is exerted on the indicating apparatus 156 causing it to be operated in the manner described above and to provide an indication of the failure. If the failure is the result of a pin hole or other leak in or around the disk 134 whereby the disk 134 remains substantially intact, a dangerous over-pressure condition in the first zone can exist without failure of the rupture disk 132 taking place. That is, the presence of pressurized fluid within the second zone between the rupture disks 132 and 134 can increase the pressurized fluid pressure required for the rupture disk 134 to rupture which in turn can bring about a dangerous over-pressure condition in the first zone. The indicating apparatus 156 of the present invention solves this problem and prevents the existence of an over-pressure condition by providing a visual indication of a failure and exhausting pressurized fluid from the second zone between the rupture disks until the situation is corrected.

If both of the rupture disks 132 and 134 fail, the relief of fluid pressure from the first zone through the second zone between the rupture disks and into the third zone causes pressurized fluid to flow through the passageway 154 and the indicating apparatus 156 to indicate that a failure has occurred.

Figure 12:
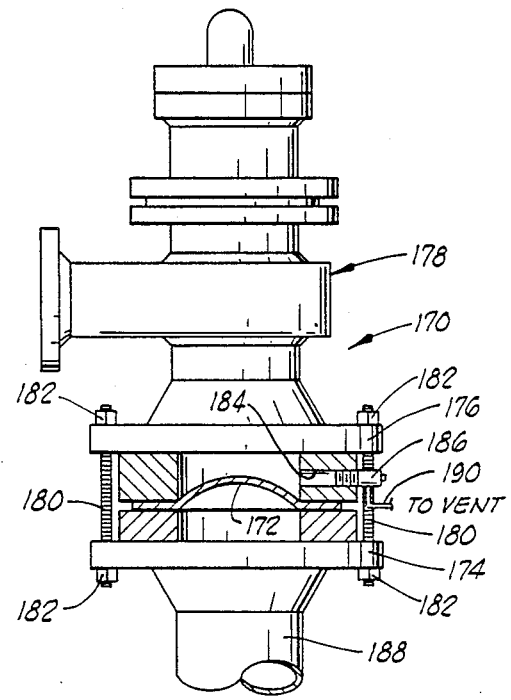
FIG. 12 is a partially cross-sectional view of still another form of failure indicating rupture disk assembly of the present invention.

Referring now to FIG. 12, still another failure indicating rupture disk assembly of the present invention is illustrated, and generally designated by the numeral 170. The assembly 170 is a rupture disk-relief valve combination which includes a rupture disk 172 clamped between a flange 174 and the corresponding flange 176 of a relief valve 178 by a plurality of studs 180 and nuts 182. A portion of the relief valve flange 176 includes a pressurized fluid communicating passageway 184 disposed therein, and a rupture disk failure indicating apparatus 186 of the present invention is sealingly connected to the passageway 184. The flange 174 is connected to a conduit 188 which is in turn connected to a first zone containing pressurized fluid. A conduit 190 conducts pressurized fluid exhausted by the rupture disk failure indicating apparatus 186 to a vent (not shown).

In operation of the assembly 170, when the fluid under pressure within the first zone reaches an over-pressure condition, the rupture disk 172 fails and fluid is relieved through the relief valve 178. Simultaneously, pressurized fluid flows through the passageway 184 causing the operation of the indicating apparatus 186 which provides a visual indication that the rupture disk 172 has failed.

As described above for the assembly 130, in the event of a pin hole or other leak in or around the rupture disk 172 whereby the disk remains substantially intact but pressurized fluid enters the second zone, i.e., the space between the rupture disk 172 and the relief valve 178, a dangerous over-pressure condition can exist in the first zone unless the pressurized fluid is exhausted from the second zone. This dangerous condition is the result of the presence of pressurized fluid pressure in the second zone which increases the fluid pressure required to cause the rupture of the rupture disk 172. This problem is obviated by the assembly 170 of the present invention with exhausts pressurized fluid from the space between the rupture disk 172 and relief valve 178 while providing a visual indication of a rupture disk failure.

Thus, the present invention is well adapted to carry out the objects and obtain the ends and advantages mentioned as well as those which are inherent therein. While numerous changes in the arrangement of parts will suggest themselves to those skilled in the art, such changes are included within the scope of the appended claims.

What is claimed is:

1. Apparatus for indicating the failure of a rupture disk comprising:

an elongated cylindrical hollow body member having an open end which includes threads formed thereon for threadedly and sealingly connecting to a passageway for communicating pressurized fluid resulting from the failure of a rupture disk thereto and having an indicator opening in the other end, said body member having an internal annular groove formed therein at the end portion thereof connected to said passageway;

a snap ring disposed in said internal annular groove for retaining said piston in said body member;

a cylindrical piston disposed in said body member for moving therein from the end portion of said body member connected to said passageway to the other end of said body member in response to pressurized fluid pressure exerted on said piston, said piston including an annular groove formed therein within which an O-ring seal is disposed;

an elongated indicator pin positioned in said body member between said piston and said other end of said body member, said indicator pin being adapted to slide through said indicator opening so that when said piston is moved by said pressurized fluid to the other end of said body member, said indicator pin is extended through said opening to thereby provide a visual indication of the failure of said rupture disk; and said body member including a pressurized fluid exhaust port formed in a side thereof and positioned so that when said piston is moved to said other end of said body member, it moves past said port and allows pressurized fluid to be exhausted therethrough.

2. The apparatus of claim 1 which is further characterized to include a compression spring disposed in said body member between said piston and said other end of said body member whereby said piston is returned by said spring to the end portion of said body member connected to said passageway after pressurized fluid is exhausted through said exhaust port.

3. A failure indicating rupture disk assembly comprising:

a first rupture disk supporting member connected to a first zone for containing pressurized fluid;

a second rupture disk supporting member connected to a second zone for receiving pressurized fluid from said first zone, said second rupture disk supporting member including a pressurized fluid passageway extending from the interior to the exterior thereof;

a rupture disk sealingly clamped between said first and second supporting members; and rupture disk failure indicating apparatus connected to said passageway for visually indicating the presence of pressurized fluid within said second zone, said indicating apparatus comprising:

an elongated cylindrical hollow body member having an open end thereof connected to said passageway of said second rupture disk supporting member and having an indicator opening in the other end, said body member having an internal annular groove formed therein at the end portion thereof connected to said passageway;

a snap ring disposed in said internal annular groove for retaining said piston in said body member;

a cylindrical piston disposed in said body member for moving therein from the end portion of said body member connected to said passageway to the other end of said body member in response to pressurized fluid pressure exerted on said piston, said piston including an annular groove formed therein within which an O-ring seal is disposed;

an elongated indicator pin positioned in said body member between said piston and said other end of said body member, said indicator pin being adapted to slide through said indicator opening so that when said piston is moved by said pressurized fluid to the other end of said body member, said indicator pin is pushed through said opening to thereby provide a visual indication of the failure of said rupture disk; and said body member including a pressurized fluid exhaust port formed in a side thereof positioned so that when said piston is moved to said other end of said body member, it moves past said port and allows pressurized fluid to be exhausted therethrough.

4. The apparatus of claim 3 which is further characterized to include a compression spring disposed in said body member between said piston and said other end of said body member whereby said piston is returned by said spring to the end portion of said body member connected to said passageway after pressurized fluid is exhausted through said port.

5. The assembly of claim 3 which is further characterized to include:
a conduit connected to said fluid pressure exhaust port of said body member; and
fluid pressure operated means for activating an alarm connected to said conduit.

6. The assembly of claim 3 wherein said first zone is a pressure vessel or system being protected from overpressure and said second zone is a pressure vessel or system for containing pressurized fluid relieved from said first zone.

7. The assembly of claim 3 wherein said first zone is a pressure vessel or system being protected from overpressure and said second zone is the space between said rupture disk and a second rupture disk positioned in series therewith.

8. The assembly of claim 3 wherein said first zone is pressure vessel or system being protected from overpressure and said second zone is the inlet of a pressure relief valve.

* * * * *